(12) United States Patent
Witz et al.

(10) Patent No.: US 8,356,636 B2
(45) Date of Patent: Jan. 22, 2013

(54) AXIALLY REINFORCED HOSE

(75) Inventors: Joel Aron Witz, Newdigate (GB); David Cox, Hertford (GB); Gerard Anthony Hall, Flintshire (GB)

(73) Assignee: BHP Billiton Petroleum Pty Ltd., Melbourne, Victoria (AU)

( * ) Notice: Subject to any disclaimer, the term of this patent is extended or adjusted under 35 U.S.C. 154(b) by 709 days.

(21) Appl. No.: 12/312,109

(22) PCT Filed: Jun. 29, 2007

(86) PCT No.: PCT/GB2007/002446
§ 371 (c)(1),
(2), (4) Date: Nov. 23, 2009

(87) PCT Pub. No.: WO2008/001114
PCT Pub. Date: Jan. 3, 2008

(65) Prior Publication Data
US 2010/0059133 A1     Mar. 11, 2010

(30) Foreign Application Priority Data

Jun. 29, 2006  (GB) .................................. 0612991.0

(51) Int. Cl.
*F16L 11/00* (2006.01)
(52) U.S. Cl. ........ 138/124; 138/172; 138/125; 138/137; 138/140
(58) Field of Classification Search .................. 138/124, 138/172, 138, 125, 133, 137, 140
See application file for complete search history.

(56) References Cited

U.S. PATENT DOCUMENTS

| | | |
|---|---|---|
| 956,076 A | 4/1910 | Greenfield |
| 1,178,559 A | 4/1916 | Vautier |
| 1,588,606 A | 6/1926 | Oden |
| 1,599,775 A | 9/1926 | Lamb et al. |
| 1,607,909 A | 11/1926 | Oden |
| 1,785,345 A | 12/1930 | Hasemann |
| 1,810,032 A | 6/1931 | Schulthess |
| 1,901,330 A | 3/1933 | Poberejsky |
| 1,911,486 A | 5/1933 | Bacheldor et al. |
| 2,011,781 A | 8/1935 | Tabozzi |
| 2,184,984 A | 12/1939 | Van Stone et al. |
| 2,371,363 A | 3/1945 | Smith |
| 2,610,869 A | 9/1952 | Percy |
| 2,661,026 A | 12/1953 | Schulthess |
| 2,706,494 A | 4/1955 | Morse |

(Continued)

FOREIGN PATENT DOCUMENTS

CN            1441884        9/2003

(Continued)

OTHER PUBLICATIONS

International Preliminary Report on Patentability for PCT/GB2007002446 dated Jan. 15, 2009.

(Continued)

*Primary Examiner* — Patrick F Brinson
(74) *Attorney, Agent, or Firm* — Brinks Hofer Gilson & Lione; G. Peter Nichols (57) ABSTRACT

A hose comprising a tubular body of flexible material arranged between an inner and an outer helically wound wire, the tubular body serving to transport fluid through the hose and to prevent fluid leakage through the body, the tubular body comprising a reinforcing layer and a sealing layer, wherein the hose further comprises axial strengthening strips extending along the length of the hose.

17 Claims, 4 Drawing Sheets

U.S. PATENT DOCUMENTS

| | | | |
|---|---|---|---|
| 2,825,364 | A | 3/1958 | Cullen et al. |
| 2,829,671 | A | 4/1958 | Ernst et al. |
| 2,858,147 | A | 10/1958 | Guarnaschelli |
| 2,940,778 | A | 6/1960 | Kaiser |
| 3,004,779 | A | 10/1961 | Cullen et al. |
| 3,140,106 | A | 7/1964 | Thomas et al. |
| 3,189,370 | A | 6/1965 | Marshail |
| 3,240,643 | A | 3/1966 | Schroeder et al. |
| 3,287,194 | A | 11/1966 | Waddell, Jr. |
| 3,318,620 | A | 5/1967 | Cullen et al. |
| 3,333,325 | A | 8/1967 | Stanley |
| 3,462,177 | A | 8/1969 | Skinner et al. |
| 3,538,728 | A | 11/1970 | Tribey |
| 3,603,719 | A | 9/1971 | Lejeune |
| RE28,155 | E | 9/1974 | Dow et al. |
| 3,856,052 | A | 12/1974 | Feucht ............................ 138/119 |
| 3,919,026 | A | 11/1975 | Mizutani et al. |
| 4,033,612 | A | 7/1977 | Chevalier |
| 4,063,757 | A | 12/1977 | Fuhrmann |
| 4,323,089 | A | 4/1982 | Kadono et al. |
| 4,330,143 | A | 5/1982 | Reneau |
| 4,344,908 | A | 8/1982 | Smith et al. ..................... 264/203 |
| 4,351,366 | A | 9/1982 | Angioletti |
| 4,377,186 | A | 3/1983 | Genini et al. |
| 4,411,845 | A | 10/1983 | Tanahashi et al. ............... 261/65 |
| 4,422,993 | A | 12/1983 | Smith et al. ................. 264/210.8 |
| 4,430,383 | A | 2/1984 | Smith et al. ..................... 428/364 |
| 4,436,689 | A | 3/1984 | Smith et al. ..................... 264/204 |
| 4,445,543 | A | 5/1984 | Mead |
| 4,634,153 | A | 1/1987 | Kishton |
| 4,826,354 | A | 5/1989 | Adorian |
| 4,924,679 | A | 5/1990 | Brigham |
| 4,950,001 | A | 8/1990 | Briggs |
| 5,182,147 | A | 1/1993 | Davis |
| 5,480,193 | A | 1/1996 | Echols et al. |
| 5,485,870 | A | 1/1996 | Kraik |
| 5,639,128 | A | 6/1997 | Belcher |
| 5,647,563 | A | 7/1997 | Gantner et al. |
| 5,685,576 | A | 11/1997 | Wolfe et al. |
| 5,698,278 | A | 12/1997 | Emond et al. |
| 5,860,682 | A | 1/1999 | Belcher |
| 5,893,681 | A | 4/1999 | Boden |
| 6,110,550 | A | 8/2000 | Jarrin et al. |
| 6,334,466 | B1 | 1/2002 | Jani et al. |
| 6,659,510 | B1 | 12/2003 | Ikegami et al. |
| 6,874,542 | B2 | 4/2005 | Mayau et al. |
| 6,923,477 | B2 | 8/2005 | Buon et al. |
| 7,243,686 | B2 | 7/2007 | Burke et al. |
| 7,712,792 | B2 | 5/2010 | Burke et al. |
| 7,735,524 | B2 | 6/2010 | Burke et al. |
| 7,743,792 | B2 | 6/2010 | Burke et al. |
| 2003/0178085 | A1 | 9/2003 | Burke et al. |
| 2004/0066035 | A1 | 4/2004 | Buon et al. |
| 2004/0112454 | A1 | 6/2004 | Takagi |
| 2004/0146676 | A1 | 7/2004 | Ikemoto |
| 2004/0256016 | A1 | 12/2004 | Arima et al. |
| 2007/0024051 | A1 | 2/2007 | Witz et al. |
| 2009/0320951 | A1 | 12/2009 | Witz et al. |
| 2010/0180976 | A1 | 7/2010 | Witz et al. |
| 2010/0183371 | A1 | 7/2010 | Witz et al. |
| 2010/0224277 | A1 | 9/2010 | Witz et al. |
| 2010/0229991 | A1 | 9/2010 | Witz et al. |
| 2010/0229992 | A1 | 9/2010 | Witz et al. |

FOREIGN PATENT DOCUMENTS

| | | |
|---|---|---|
| CN | 1732352 | 2/2006 |
| DE | 1 425 453 | 7/1969 |
| DE | 2 431 277 | 1/1975 |
| DE | 2 948 416 | 6/1981 |
| DE | 3 440 459 | 5/1986 |
| DE | 9 207 276 | 10/1992 |
| DE | 9 407 409 | 7/1994 |
| DE | 10 2005 046367 | 4/2006 |
| EP | 0 032 352 | 7/1981 |
| EP | 0076540 A1 | 4/1983 |
| EP | 0183285 A1 | 6/1986 |
| EP | 0215507 A1 | 3/1987 |
| EP | 0 241 656 | 10/1987 |
| EP | 0438831 A1 | 7/1991 |
| EP | 0 264 587 | 4/1998 |
| EP | 0 855 496 | 7/1998 |
| EP | 0 895 013 | 5/2000 |
| EP | 0 833 769 | 10/2001 |
| EP | 1 288 558 | 3/2003 |
| EP | 1344969 A2 | 9/2003 |
| EP | 1 428 748 | 6/2004 |
| FR | 1499956 | 4/1966 |
| FR | 2194906 A1 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 A | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 93/24731 | 12/1993 |
| WO | WO 96/36592 | 11/1996 |
| WO | WO 97/00805 | 1/1997 |
| WO | WO 2005/119150 | 12/2005 |
| WO | WO 2006/044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Pipe", by Joel Aron Witz filed Mar. 12, 2010 as U.S. Appl. No. 12/677,852.

Patent Application entitled, "Improvements Relating to Hose End Fittings", by Joel Aron Witz filed Jun. 15, 2010 as U.S. Appl. No. 12/667,853.

Patent Application entitled, "Hose", by Joel Aron Witz filed Jun. 10, 2010 as U.S. Appl. No. 12/667,854.

International Search Report and Written Opinion for PCT Application Serial No. PCT/GB2008/003098, dated Dec. 12, 2008, 6 pages.

International Preliminary Report on Patentability for PCT Application Serial No. PCT/GB2008/003098, dated Mar. 16, 2010, 5 pages.

International Search Report and Written Opinion for PCT Application Serial No. PCT/GB2008/003135, dated Dec. 12, 2008, 7 pages.

International Preliminary Report on Patentability for PCT Application Serial No. PCT/GB2008/003135, dated Mar. 16, 2010, 6 pages.

International Search Report and Written Opinion for PCT Application Serial No. PCT/GB2008/003121, dated Dec. 15, 2008, 10 pages.

International Prelimiary Report on Patentability for PCT Application Serial No. PCT/GB2008/003121, dated Mar. 16, 2010, 7 pages.

International Search Report for PCT Application Serial No. PCT/GB01/02562.

International Preliminary Examination Report for PCT Application Serial No. PCT/GB01/02562, published on Dec. 20, 2001.
International Preliminary Report on Patentability and Written Opinion for PCT Application Serial No. PCT/GB2007/003063, dated Feb. 26, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

AXIALLY REINFORCED HOSE

BACKGROUND OF THE INVENTION

1. Field of the Invention

This invention relates to hose, and more particularly relates to hose having improved axial strength. The invention is especially concerned with hose which can be used in cryogenic conditions.

2. Description of the Related Art

Typical applications for hose involve the pumping of fluids from a fluid reservoir under pressure. Examples include supplying of domestic heating oil or LPG to a boiler; transporting produced oilfield liquids and/or gases from a fixed or floating production platform to the cargo hold of a ship, or from a ship cargo hold to a land-based storage unit; delivering of fuel to racing cars, especially during refuelling in formula 1; and conveying corrosive fluids, such as sulphuric acid.

It is well known to use hose for the transport of fluids, such as liquefied gases, at low temperature. Such hose is commonly used to transport liquefied gases such as liquefied natural gas (LNG) and liquefied propane gas (LPG).

In order for the hose to be sufficiently flexible, any given length must be at least partially constructed of flexible materials, i.e., non-rigid materials.

The structure of such hose generally comprises a tubular body of flexible material arranged between the inner and outer helically wound retaining wires. It is conventional for the two wires to be wound at the same pitch, but to have the windings displaced by half a pitch width from one another. The tubular body typically comprises inner and outer layers with an intermediate sealing layer. The inner and outer layers provide the structure with the strength to carry the fluid therein. Conventionally, the inner and outer layers of the tubular body comprise fabric layers formed of a polyester such as polyethylene terephthalate. The intermediate sealing layer provides a seal to prevent the fluid from penetrating the hose, and is typically a polymeric film.

The retaining wires are typically applied under tension around the inside and outside surfaces of the tubular body. The retaining wires act primarily to preserve the geometry of the tubular body. Furthermore, the outer wire may act to restrain excessive hoop deformation of the hose under high pressure. The inner and outer wires may also act to resist crushing of the hose.

A hose of this general type is described in European patent publication no. 0076540A1. The hose described in this specification includes an intermediate layer of biaxially oriented polypropylene, which is said to improve the ability of the hose to resist the fatigue caused by repeated flexing.

Another hose is described in GB-2223817A. The hose described in this publication is a composite hose comprising an inner helical metallic core, a plurality of layers of plastics material fibres and films wound on the core, at least one layer of glass cloth and at least one layer of aluminium foil disposed adjacent one another and wound onto the plastics material, and an outer helical metallic former. This hose is said to be suitable for transporting flammable fuels and oils. Various improvements to composite hose are described in our WO01/96772, WO 2004/044472 and WO 2004/079248, the contents of which are incorporated by reference.

Another hose structure is disclosed in U.S. Pat. No. 3,856,052.

Broadly, we provide an axial strengthening means for hose, whereby the hose can withstand greater axial tension than has previously been possible, without impairing the other properties of the hose.

BRIEF DESCRIPTION OF THE DRAWINGS

Reference is now made to the accompanying drawings, in which.

DETAILED DESCRIPTION OF THE INVENTION

According to a first aspect of the invention there is provided a hose comprising a tubular body of flexible material arranged between inner and outer gripping members, wherein the hose further comprises an axial strengthening means adapted to reduce deformation of the tubular body when the tubular body is subjected to axial tension, wherein the axial strengthening means comprises a plurality of axial strengthening strips extending along the length of the hose.

By means of this arrangement, the axial strengthening means improves the ability of the hose to cope with axial stresses. In addition, the materials of the tubular body and the axial strengthening means are advantageously compatible so that they each perform in a similar manner when in operation, so that no single component is subjected to excessive stresses and strains. This means that the materials of the tubular body and the axial strengthening means respond to strain in a similar manner.

The axial strengthening strips are particularly useful in a hose for hose applications where the hose is suspended between two points and the hose is taking its own weight plus weight of fluid without any intermediate support.

The axial strengthening strips are preferably equi-spaced around the circumference of the hose. There may be two, three, four, five, six, seven, eight or more strips. More preferably there are three, four, five or six strips, with four or six strips being most preferred.

Preferably each axial strengthening strip is made of a fabric having a warp and a weft. More preferably, the warp of each axial strengthening strip is arranged at an angle of 0° to 10° to the longitudinal axis of the hose. Still more preferably, the warp of each axial strengthening strip is arranged at an angle of 0° to 5° to the longitudinal axis of the hose. Most preferably, the warp of each axial strengthening strip is arranged at an angle of 0° to 2° to the longitudinal axis of the hose.

The strips may be held in place using tapes or strings wound almost circumferentially as a manufacturing aid during the hose construction. These tapes may be made from natural fibres (for example, cotton) or man made fibres (for example, polyester). On completion of the hose, the tension applied by the inner and outer gripping members further helps to retain the strips within the tubular body.

Each strip is preferably free to move relative to the rest of the hose, during bending of the hose, i.e., the strips are preferably not fixedly secured to the rest of the hose.

The hose preferably also includes an end fitting disposed at each longitudinal end of the hose. The end fitting is preferably fixedly secured to the tubular body and the axial strengthening strips. Thus, when a force is applied to axially stretch the hose, the or each axial strengthening strip resists the stretching force. Suitable end fittings are described in WO01/96772 and WO 2004/044472. For example, the strips may be secured within the hose tubular body gripped by the end fitting, which may be retained by the end fitting by gripping by mechanical retention, or by swaging or crimping or wire binding with or without the application of epoxy resin within the end fitting. In one embodiment the strips may be terminated separately (for example, as shown in WO2004/044472 or using a ring where the strip is taken around and sewn back on itself.)

The width of the axial strengthening strips is preferably such that the axial strengthening strips, in combination, cover from 10% to 90% of the hose circumference underlying the strip, i.e. 90% to 10% of the circumference is preferably not covered.

In a preferred embodiment, the width of the axial strengthening strips is preferably such that the axial strengthening strips, in combination, cover from 20% to 50% of the hose circumference underlying the strip, i.e. 80% to 50% of the circumference is preferably not covered. For example, for a 200 mm hose with a total strip coverage of about one third and three equi-spaced strips: the individual strip width would be Pi times 200 mm times one third times one third to give an individual strip width of about 70 mm. For four strips the individual strip width would be about 52 mm. The width of the strip is the distance from one longitudinal edge to the other in a direction perpendicular to the longitudinal axis of the strip.

It is preferred that each individual strip has a width such that it covers from about 5% to about 20% of the total circumference of the underlying part of the hose.

It is preferred that the axial strengthening strip does not extend around the entire circumference of the hose. It is also preferred that the axial strengthening strip is not provided in the form of a tube around the hose.

In the preferred embodiment there are a plurality of strips arranged such that they have only a slight effect on the bending stiffness/flexibility of the hose, but give a proportionally large increase in the axial stiffness. The warp of the or each strip is preferably aligned with the longitudinal axis of the hose.

The hose may be provided with a tubular axial strengthening braid, as described in WO01/96772. The tubular braid may be disposed, for example, between the axial strengthening strips and the tubular body, or between the axial strengthening strips and the outer gripping member.

It is particularly preferred that the axial strengthening means is made of a non-metallic material, especially a plastics material—suitable materials are discussed in detail below. This is because metallic materials are unlikely to have the desired strain characteristics.

It is preferred that the tubular body and the axial strengthening means comprise the same material, most preferably ultra high molecular weight polyethylene (UHMWPE), as described in further detail below.

The tubular body preferably comprises at least one reinforcing layer and at least one sealing layer. More preferably, there are at least two reinforcing layers with the sealing layer sandwiched therebetween.

Preferably, a further reinforcing layer is provided between the outer gripping member and the axial strengthening means.

The ultimate strength of the reinforcing layer(s) is preferably between 100 and 700 kN for an 8" (200 mm) diameter hose. It is preferable that the bend strain at failure of the reinforcing layer(s) is in the range 2% to 15%. Desirably, further reinforcing layer(s) are the same material as the axial strengthening means, most preferably UHMWPE.

The materials of construction of the hose should be selected to enable the hose to perform in the environment for which it is intended. Thus, there is a need for the hose to be able to transport pressurised fluids therethrough without leakage of the fluid through the walls of the hose. There is also a need for the hose to withstand repeated flexing, and to withstand the axial stresses caused by the combination of the hose and fluid weight. Also, if the hose is intended for use in transporting cryogenic fluids, the materials should be capable of operating at extremely cold temperatures without any significant reduction in performance.

The main purpose of the or each reinforcing layer is to withstand the hoop stresses which the hose is subjected to during transport of fluids therethrough. Thus, any reinforcing layer which has the required degree of flexibility, and which can withstand the necessary stresses, will be adequate. Also, if the hose is intended for transporting cryogenic fluids, then the or each reinforcing layer must be able to withstand cryogenic temperatures.

We prefer that the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose.

In the preferred embodiment each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate.

When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (registered trade mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. Nos. 4,344,908, 4,411,845, 4,422,993, 4,430,383, 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA.

Additional details about DYNEEMA are disclosed in a trade brochure entitled "DYNEEMA; the top performance in fibers; properties and application" issued by DSM High Performance Fibers BV, edition February 1998. Additional details about SPECTRA are disclosed in a trade brochure entitled "Spectra Performance Materials" issued by Allied-Signal Inc., edition May 1996. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than 20° to the axial direction of the hose; we also prefer that this angle is greater than 5°. In the preferred embodiment, the or each reinforcing layer is arranged such that the fabric warp direction is at an angle of from 10° to 20°, most preferably about 15° to the axial direction of the hose.

The purpose of the sealing layer is primarily to prevent the leakage of transported fluids through the tubular body. Thus, any sealing layer which has the required degree of flexibility, and which can provide the desired sealing function, will be adequate. Also, if the hose is intended for transporting cryogenic fluids, then the sealing layer must be able to withstand cryogenic temperatures.

The sealing layer may be made from the same basic materials as the or each reinforcing layer. As an alternative, the sealing layer may be a fluoropolymer, such as: polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon—perfluoralkoxy—available from DuPont Fluoroproducts under the trade name Teflon PFA. These films may be made by extrusion or by blowing.

We prefer that the sealing layer is formed of a sheet of material which has been wound into a tubular form by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the hose) the or each layer of the sheet material would be formed of a plurality of separate lengths of sheet material arranged along the length of the hose. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometers.

It will, of course, be appreciated that more than one sealing layer may be provided.

A particularly preferred embodiment of the sealing layer is described below.

Each axial strengthening strip may also be formed of the same material as the or each reinforcing layer. Thus, it will be clear that the axial strengthening strips, the or each reinforcing layer and the sealing layer may all be formed from the same basic compound. However, the form of the compound must be different in order to provide the required function, i.e., the axial strengthening strips provide an axial reinforcement function, the or each reinforcing layer provides reinforcement against hoop stresses, and the sealing layer provides a sealing function. We have found that the UHMWPE materials are most suitable, particularly the DYNEEMA and SPECTRA products. These materials have also been found to work well in cryogenic conditions. The preferred parameters of the UHMWPE (molecular weight range, etc) discussed above in relation to the reinforcing layers, are also appropriate to the axial strengthening means. In this regard is should be noted, however, that the parameters of the UHMWPE used in the axial strengthening strip need not be the same as the parameters of the UHMWPE used in the reinforcing layers.

It is possible for the axial strengthening strips to be provided within the layers of the tubular body. However we prefer than each axial strengthening strip is positioned between the tubular body and one or more reinforcing layers and the outer gripping member. The reinforcing layers lying over the axial strengthening strips provide a protective covering sheet below the outer gripping member. In another preferred embodiment, at least two axial strengthening strips (preferably more than two, e.g., three or four) is provided within the layers of the tubular body, and at least two further axial strengthening strips (preferably more than two, e.g., three or four) is also provided between the tubular body and the outer gripping member.

It will be appreciated from the foregoing that an additional layer may be provided over the tubular body, and underneath the outer gripping member. The additional layer may be wrapped around the tubular body or it may be in the form of a tube pulled over the tubular body. The additional layer may be a protective layer, a reinforcing layer, or both. Preferably the axial strengthening strips underlie the additional layer.

When the hose is intended for cryogenic applications, then it is desirable to provide insulation over the tubular body. The insulation could be provided between the outer wire and the tubular sheath and/or outside the outer wire. The insulation may comprise material conventionally used to provide insulation in cryogenic equipment, such as a synthetic foam material. It is preferred that the axial strengthening means is also provided around the insulating layer to compress the insulation layers and maintain their structural integrity. The axial strengthening means around the insulation layer is preferably provided in addition to the axial strengthening means between the outer gripping member and the tubular body. A particular suitable form of insulation is provided in further detail below.

According to another aspect of the invention there is provided a hose comprising a tubular body of flexible material arranged between inner and outer gripping members, wherein the tubular body comprises at least one reinforcing layer of a woven fabric formed of fibres arranged in a weft and warp direction, characterised in that the or each reinforcing layer is arranged such that the fabric warp direction is at an angle of less than 20°, more preferably less than 15°, and most preferably less than 10° to the axial direction of the hose. The hose according to this aspect of the invention may be provided with any desired combination of the additional features described in relation to the hose according to the first aspect of the invention.

According to another aspect of the invention there is provided a method of making a hose comprising:
(a) wrapping an inner gripping member around a tubular mandrel;
(b) wrapping a sheet material around the tubular mandrel and the inner gripping member to provide a tubular body formed of the sheet material;
(c) laying a plurality of axial strengthening strips along the length of the tubular body
(d) wrapping an outer gripping member around each axial strengthening strip;
(e) securing the ends of the hose produced in step (d); and
(f) removing the hose from the mandrel.

Preferably the gripping members and the sheet material are applied under tension in order to provide the hose with good structural integrity.

Preferably the sheet material in step (b) comprises two reinforcing layers sandwiching a sealing layer, as described above. In the preferred embodiment, an inner reinforcing layer, in sheet form, is wrapped helically around the inner gripping member and the mandrel; then the sealing layer, in sheet form, is wrapped helically around the inner reinforcing layer; then the outer reinforcing layer, in sheet form, is wrapped around the sealing layer. Usually a plurality of sealing layers would be applied.

Each axial strengthening strip may be the same as the axial strengthening strips described above.

Preferably the inner and outer gripping members are applied in a helical configuration having the same pitch, and the position of the helix outer gripping member is positioned half a pitch length offset from the position of the helix of the inner gripping member.

Preferably, between steps (c) and (d), and additional layer (which may be protective, reinforcing, or both) is wrapped around the tubular body, over the axial strengthening strips. Alternatively, the additional layer may be a tube which is pulled over the tubular body.

Each polymeric film of the sealing layer is preferably a polyamide, a polyolefin or a fluoropolymer.

When the polymeric film of the sealing layer comprises a polyamide, then it may be an aliphatic polyamide, such as a nylon, or it may be an aromatic polyamide, such as an aramid compound.

We prefer that one of the polymeric films of the sealing layer is a polyolefin and that another of the polymeric films of the sealing layer is a fluoropolymer.

Suitable polyolefins include a polyethylene, polypropylene or polybutylene homopolymer, or a copolymer or terpolymer thereof. Preferably the polyolefin film is monoaxially or biaxially oriented. More preferably, the polyolefin is a polyethylene, and most preferably the polyethylene is a high molecular weight polyethylene, especially UHMWPE, which is described in greater detail above. The preferred parameters of the UHMWPE (molecular weight range, etc) discussed above in relation to the reinforcing layers, are also appropriate to the sealing layer. In this regard is should be noted, however, that the parameters of the UHMWPE used in the sealing layer need not be the same as the parameters of the UHMWPE used in the reinforcing layers.

Since the sealing layer is intended to provide a sealing function, the sealing layer should be provided in the form of a film which is substantially impermeable to the transported fluids. Thus, the highly oriented UHMWPE needs to be provided in a form which has satisfactory sealing properties. These products are usually provided in the form of a solid block which can be further processed in order to obtain the material in the required form. The film may be produced by skiving a thin film off the surface of the solid block. Alternatively the films may be blown films of UHMWPE.

Suitable fluoropolymers include polytetrafluoroethylene (PFTE); a fluorinated ethylene propylene copolymer, such as a copolymer of hexafluoropropylene and tetrafluoroethylene (tetrafluoroethylene-perfluoropropylene) available from DuPont Fluoroproducts under the trade name Teflon FEP; or a fluorinated hydrocarbon—perfluoralkoxy—available from DuPont Fluoroproducts under the trade name Teflon PFA. These films may be made by extrusion or by blowing.

Preferably, the sealing layer comprises a plurality of layers of each of the polymeric films. In an embodiment, the layers may be arranged so that the first and second polymers alternate through the thickness of the sealing layer. However, this is not the only possible arrangement. In another arrangement all the layers of the first polymer may be surrounded by all the layers of the second polymer, or vice versa.

We prefer that the polymeric films of the sealing layer are formed of a sheet of material which has been wound into a tubular form by winding the sheet material in a helical manner. Each polymeric film may comprise a single continuous sheet which is wrapped around the inner reinforcing layer from one end of the hose to the other. However, more usually (and depending on the length of the hose) a plurality of separate lengths of the polymeric film would be wound around the inner reinforcing layer, each length of film covering a part of the length of the hose. If desired the sealing layer may comprise at feast two heat shrinkable sealing sleeves (i.e. tubular in form) which are arranged over the inner reinforcing layer. At least two of the sleeves should be made of a different material.

The sealing layer comprises at least two different films and these are preferably arranged in an overlapping relationship. It is preferred that the sealing layer comprises least 5 overlapping layers, more preferably at least 10 overlapping layers. In practice, the sealing layer may comprise 20, 30, 40, 50, or more overlapping layers of film. The upper limit for the number of layers depends upon the overall size of the hose, but it is unlikely that more than 100 layers would be required. Usually, 50 layers, at most, will be sufficient. The thickness of each layer of film would typically be in the range 50 to 100 micrometers. The layers will be made up of at least two different types of polymeric film.

It will, of course, be appreciated that more than one sealing layer may be provided.

Preferably, the sealing layer further comprises at least one layer partially or entirely comprising a metal, a metal oxide or a mixture thereof. In this specification references to metal containing films includes metal oxide containing films, unless stated otherwise. Thus, the metal layer may be a layer of metallic film (i.e. a separate layer consisting substantially entirely of a metal, a metal oxide or a mixture thereof), or a polymer coated metallic film or a metallised polymer film. We prefer that the metal layer is a polymer coated metallic film. The metal may be, for example, aluminium oxide. The polymer may be, for example, a polyester.

Suitable polymer coated metal films include the films available from HiFi Industrial Film, of Stevenage, England, under the trade names MEX505, MET800, MET800B and MET852; MET800B is preferred.

A further metal layer may be disposed outwardly of the sealing layer. Preferably, the further metal layer is disposed between the tubular body and the outer gripping member. Rockwool layers may also be provided here to improve the thermal insulation, preferably between the sealing layer and the outer metal layer—the aim of this is to create a thermal annulus between the two metal layers.

In the above described aspects of the invention, the gripping members typically each comprise a helically gripping member, preferably a wire. Preferably each gripping member is in the form of a coil. The helices of the gripping members are typically arranged such that they are offset from one another by a distance corresponding to half the pitch of the helices. The purpose of the gripping members is to grip the tubular body therebetween to keep the layers of the tubular body intact and to provide structural integrity for the hose. The inner and outer wires may be, for example, mild steel, austenitic stainless steel or aluminium. If desired, the wires may be galvanised or coated with a polymer. The inner gripping member can perform the function of supporting the outer layers of the hose. The outer gripping member can perform the function of supporting the hose against internal pressure caused by fluid within the hose, i.e., hoop and radial forces on the hose.

It will be appreciated that although the wires making up the gripping members may have a considerable tensile strength, the arrangement of the wires in coils means that the gripping members can deform when subjected to relatively small axial tension. Any significant deformation in the coils will quickly destroy the structural integrity of the hose.

The hose according to the invention can be provided for use in a wide variety of conditions, such as temperatures above 100° C., temperatures from 0° C. to 100° C. and temperatures below 0° C. With a suitable choice of material, the hose can be used at temperatures below −20° C., below −50° C. or even below −100° C. For example, for LNG transport, the hose may have to operate at temperatures down to −170° C., or even lower. Furthermore, it is also contemplated that the hose may be used to transport liquid oxygen (bp −183° C.) or liquid nitrogen (bp −196° C.), in which case the hose may need to operate at temperatures of −200° C. or lower.

The hose according to the invention can also be provided for use at a variety of different duties. Typically, the inner diameter of the hose would range from about 2 inches (51 mm) to about 24 inches (610 mm), more typically from about 8 inches (203 mm) to about 16 inches (406 mm). In general, the operating pressure of the hose would be in the range from about 500 kPa gauge up to about 2000 kPa gauge, or possibly up to about 2500 kPa gauge. These pressures relate to the operating pressure of the hose, not the burst pressure (which must be several times greater). The volumetric flow rate depends upon the fluid medium, the pressure and the inner diameter. Flowrates from 1000 m$^3$/h up to 12000 m$^3$/h are typical.

Figure 1:
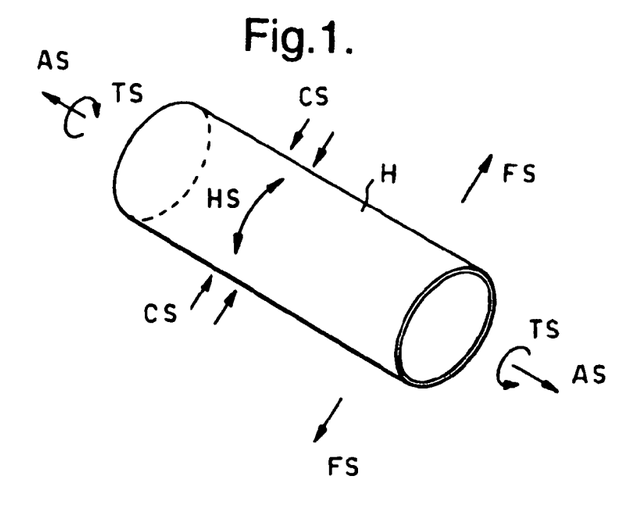
FIG. 1 is a schematic diagram showing the principle stresses to which the hose according to the invention may be subjected in operation.

The hose according to the invention can also be provided for use with corrosive materials, such as strong acids, FIG. 1 shows the stresses to which a hose H is normally subjected to during use. The hoop stress is designated by the arrows HS and is the stress that acts tangentially to the periphery of the hose H. The axial stress is designated by the arrows AS and is the stress which acts axially along the length of the hose H. The flexing stress is designated FS and is the stress which acts transverse to the longitudinal axis of the hose H when it is flexed. The torsional stress is designated TS and is a twisting stress which acts about the longitudinal axis of the hose. The crushing stress is designated CS and results from loads applied radially to the exterior of the hose H.

The hoop stress HS is generated by the pressure of the fluid in the hose H. The axial stress AS is generated by the pressure of the fluid in the hose and also by the combination of the weight of the fluid in the hose H and by the weight of the hose H itself. The flexing stress FS is caused by the requirement to bend the hose H in order to position it properly, and by movement of the hose H during use. The torsional stress TS is caused by twisting of the hose. Prior art hose is generally capable of withstanding the hoop stresses HS, the flexing stresses FS and the torsional stresses TS, but is less capable of withstanding the axial stresses AS. For this reason, when prior art hoses were subjected to large axial stresses AS they generally had to be supported, to minimise the axial stresses AS.

Figure 2:
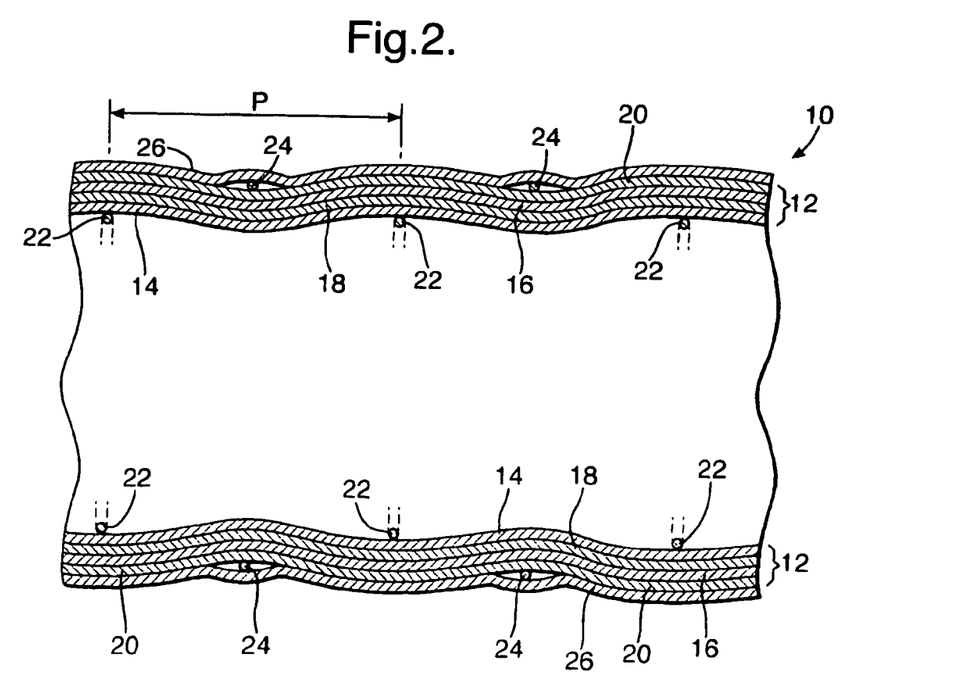
FIG. 2 is a schematic cross-sectional view of a hose according to the invention.

In FIG. 2 a hose in accordance with the invention is generally designated 10. In order to improve the clarity the winding of the various layers in FIG. 2, and in the other Figures, has not been shown.

The hose 10 comprises a tubular body 12 which comprises an inner reinforcing layer 14, an outer reinforcing layer 16, and a sealing layer 18 sandwiched between the layers 14 and 16. Axial strengthening strips 20, which provide axial strengthening, are disposed around the outer surface of the outer reinforcing layer 16.

The tubular body 12 and the strips 20 are disposed between an inner helically coiled wire 22 and an outer helically coiled wire 24. The inner and outer wires 22 and 24 are disposed so that they are offset from one another by a distance corresponding to half the pitch length of the helix of the coils.

An insulation layer 26 is disposed around the outer wire 24. The insulation layer may be a conventional insulating material, such as a plastics foam, or may be a material described below in relation to FIG. 7.

Figure 3:
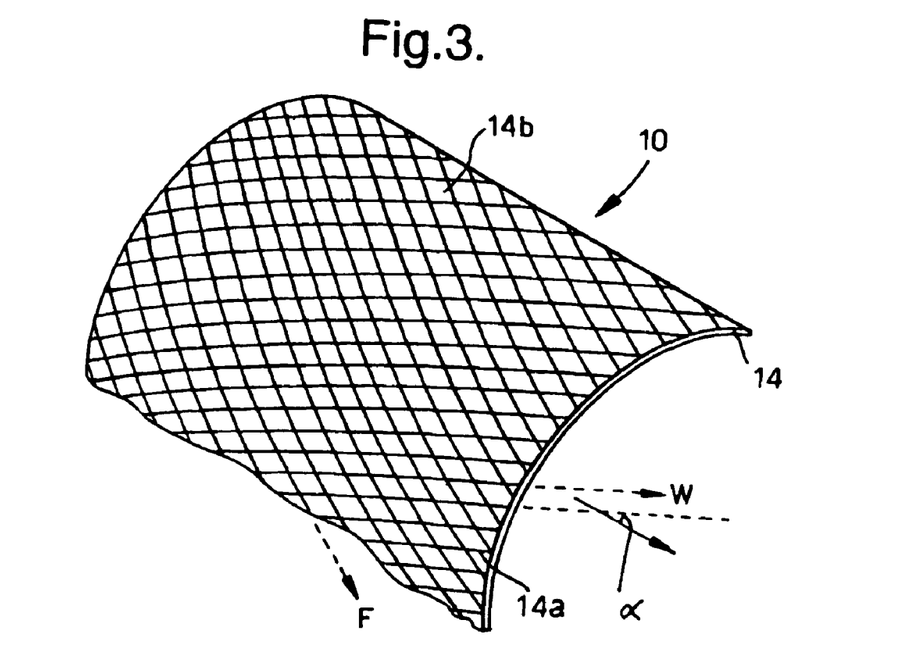
FIG. 3 is a sectional view showing the arrangement of a reinforcing layer of the hose according to the invention.

The reinforcing layers 14 and 16 comprise woven fabrics of a synthetic material, such as UHMWPE or aramid fibres. FIG. 3 illustrates the inner reinforcing layer 14, from which it will be clear that the inner reinforcing layer 14 comprises fibres 14a arranged in a warp direction W, and fibres 14b arranged in a weft direction F. In FIG. 3 only the layer 14 has been shown, in order to improve the clarity. We have unexpectedly found that the axial strength of the hose 10 can be improved by arranging the inner reinforcing layer 14 such that the warp direction W is at a low angle, of less than 20° and typically around 15° to the longitudinal axis of the hose 10. This angle is indicated by the symbol α in FIG. 3. The structure and orientation of the outer reinforcing layer 16 is substantially identical to the inner reinforcing layer 14; the angle α for the outer reinforcing layer 16 may be the same as, or different from, the angle α for the inner reinforcing layer 14.

The sealing layer 18 comprises a plurality of layers of plastics film which are wrapped around the outer surface of the inner reinforcing layer 14 to provide a fluid tight seal between the inner and outer reinforcing layers 14 and 16.

Figure 4A:
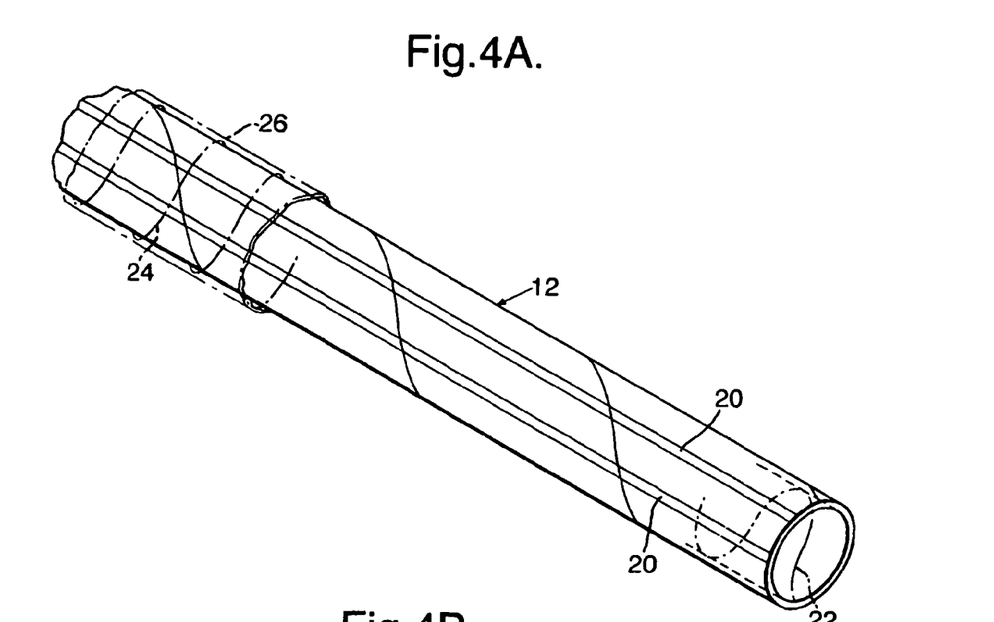
FIG. 4A is a perspective view showing the arrangement of axial strengthening strips on the hose.
Figure 4B:
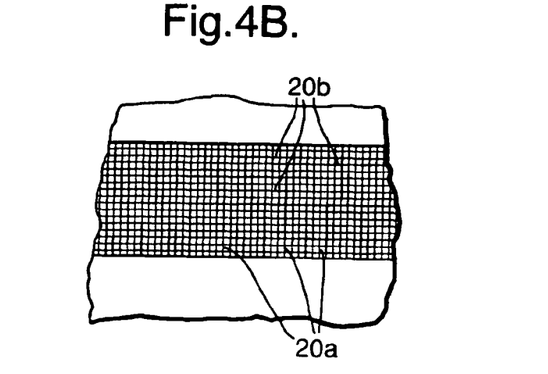
FIG. 4B is an enlarged section of one of the axial strengthening strips.

FIGS. 4A and 4B illustrate the axial strengthening strips in greater details. The strips 20 are made of a fabric having a warp 20a and a weft 20b. The warp is at 90° to the weft, and the strips 20 are arranged on the hose such that the direction of the warp is at 0° to the longitudinal axis of the hose. As shown in FIG. 4A, an additional reinforcing and/or protective layer 30 is preferable provided between the strips 20 and the outer gripping member 24.

Figure 6:
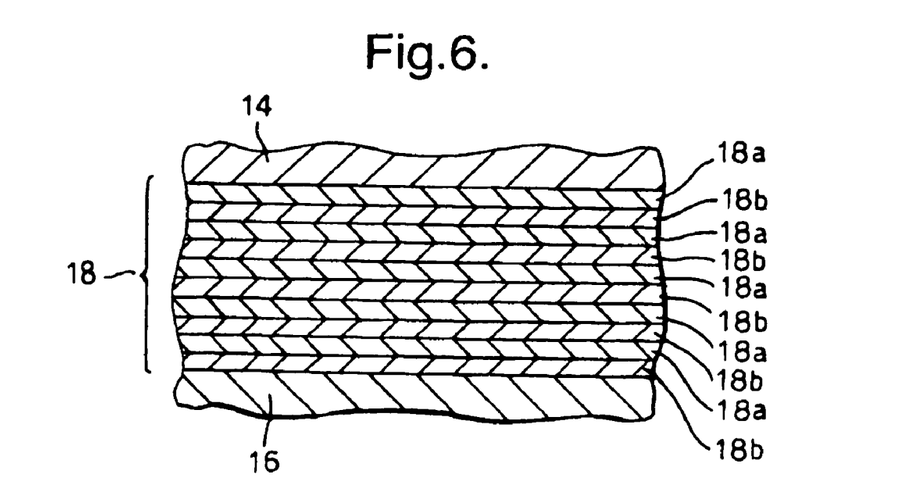
FIG. 6 is a cross-sectional view showing the a sealing layer of a hose according to the invention.

As shown in FIG. 6, the sealing layer 18 comprises a plurality of layers 18a of a film made of a first polymer (such as a highly oriented UHMWPE) interleaved with a plurality of layers 18b of a film made of a second polymer (such as PFTE or FEP), the two polymers having a different stiffness. The layers 18a and 18b have been wrapped around the outer surface of the inner reinforcing layer 14 to provide a fluid tight seal between the inner and outer reinforcing layers 14 and 16. As mentioned above, the layers 18a and 18b do not necessarily have to be arranged in an alternative fashion. For example, all the layers 18a could be arranged together, and all the layers 18b could be arranged together.

The hose 10 can be manufactured by the following technique. As a first step the inner wire 22 is wound around a support mandrel (not shown), in order to provide a helical arrangement having a desired pitch. The diameter of the support mandrel corresponds to the desired internal diameter of the hose 10. The inner reinforcing layer 14 is then wrapped around the inner wire 22 and the support mandrel, such that warp direction W is set at the desired angle α.

A plurality of layers of the plastics films 18a, 18b making up the sealing layer 18 are then wrapped around the outer surface of the inner reinforcing layer 14. Usually, the films 18a and 18b would have a length substantially less than the length of the hose 10, so that a plurality of separate lengths of the films 18a and 18b would have to be wound around the inner layer 14. The films 18a and 18b are preferably arranged in an alternating fashion through the thickness of the sealing layer 18. Typically there might be five separate layers of the films 18a and 18b through the thickness of the sealing layer.

The outer reinforcing layer 16 is then wrapped around the sealing layer 18, such that the warp direction W is set at the desired angle (which may be α, or may be some other angle close to α). The axial strengthening strips 20 are then laid over the outside of the outer reinforcing layer 16. The outer wire 24 is then wrapped around the further reinforcing layer 21, in order to provide a helical arrangement having a desired pitch. The pitch of the outer wire 24 would normally be the same as the pitch of the inner wire 22, and the position of the wire 24 would normally be such that the coils of the wire 24 are offset from the coils of the wire 22 by a distance corresponding to half a pitch length; this is illustrated in FIG. 2, where the pitch length is designated p.

The ends of the hose 10 may be sealed by crimping a sleeve onto an insert inside the hose 10. This termination is generally applied after the hose 10 as been removed from the mandrel.

Figure 5A:
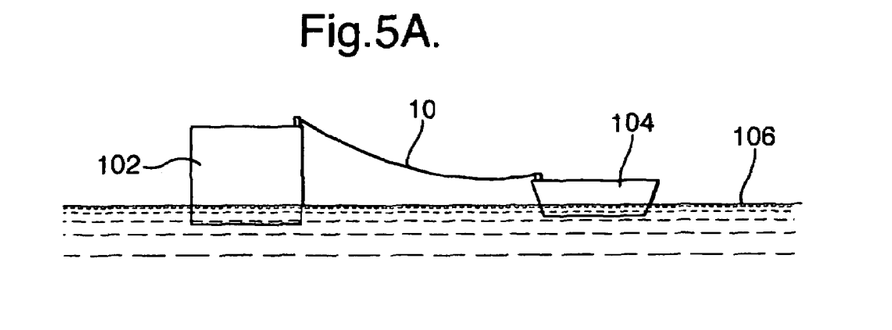
FIGS. 5A, 5B, 5C and 5D show four applications of hose according to the present invention.
Figure 5B:
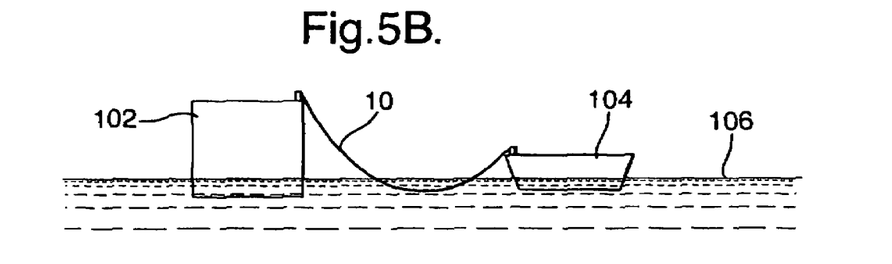
Figure 5C:
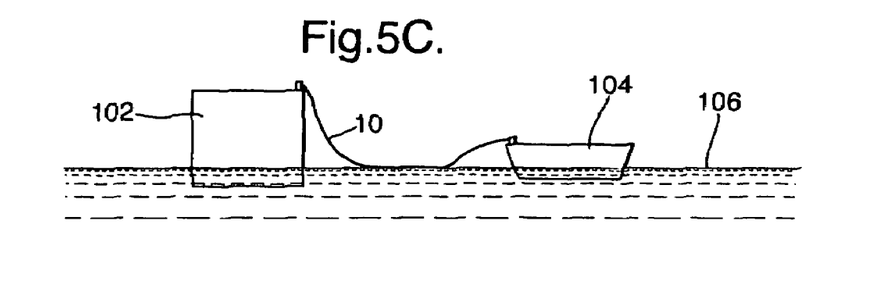
Figure 5D:
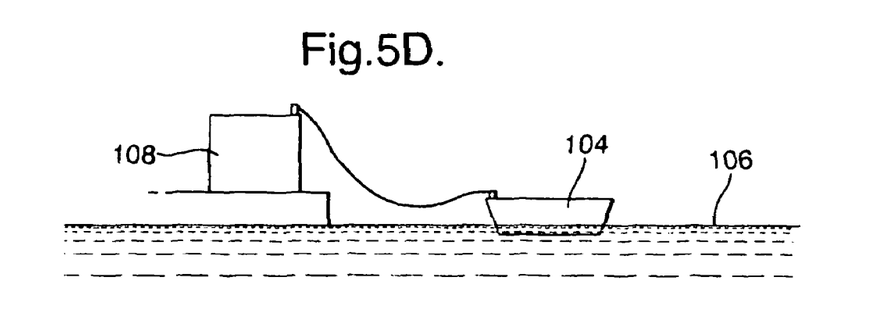

The ends of the hose 10 may be sealed using an end fitting 200 shown in FIG. 2. FIGS. 5A to 5D show three applications for the hose 10. In each of FIGS. 5A to 5C a floating production, storage and offloading vessel (FPSO) 102 is linked to a LNG carrier 104 by means of a hose 10 according to the invention. The hose 10 carries LNG from a storage tank of the FPSO 102 to a storage tank of the LNG carrier 104. In FIG. 5A, the hose 10 lies above the sea level 106. In FIG. 5B, the hose 10 is submerged below the sea level 106. In FIG. 5C, the hose 10 floats near the surface of the sea. In each case the hose 10 carries the LNG without any intermediate support. In FIG. 5D the LNG carrier is linked to a land-based storage facility 108 via the hose 10.

The hose 10 may be used for many other applications apart from the applications shown in FIGS. 5A to 5C. The hose may be used in cryogenic and non-cryogenic conditions.

It will be appreciated that the invention described above may be modified.

The invention claimed is:

1. A hose comprising a tubular body of flexible material arranged between an inner and an outer gripping member, the tubular body serving to transport fluid through the hose and to prevent fluid leakage through the body, the tubular body comprising a reinforcing layer and a sealing layer, wherein the hose further comprises a plurality of axial strengthening strips extending along the length of the hose and being made of a fabric having a warp and a weft such that the warp is arranged at an angle of 0° to 5° to the longitudinal axis.

2. A hose according to claim 1, wherein the width of the axial strengthening strips is such that the axial strengthening strips, in combination, cover from 20% to 50% of the hose circumference underlying the strip.

3. A hose according to claim 1, wherein said axial strengthening strips are equi-spaced around the circumference of the hose.

4. A hose according to claim 1, wherein there are four to six of said axial strengthening strips.

5. A hose according to claim 1, further comprising an end fitting disposed at each longitudinal end of the hose, and wherein the ends the tubular body and the axial strengthening strips are fixedly secured to each end fitting.

6. A hose according to claim 1, wherein the axial strengthening strips do not extend around the entire circumference of the hose.

7. A hose according to claim 1, wherein the tubular body comprises an inner and outer reinforcing layer, and the sealing layer is sandwiched between the inner and outer reinforcing layers.

8. A hose according to claim 1, wherein the or each reinforcing layer of the tubular body, and the axial strengthening strips, are all made of the same polymeric material.

9. A hose according to claim 1, wherein the or each reinforcing layer of the tubular body, and the axial strengthening strips, are all made of UHMWPE.

10. A hose according to claim 1, wherein each individual strip has a width such that it covers from about 5% to about 20% of the total circumference of the underlying part of the hose.

11. A hose according to claim 2, wherein there are four to six of said axial strengthening strips.

12. A hose according to claim 11, further comprising an end fitting disposed at each longitudinal end of the hose, and wherein the ends the tubular body and the axial strengthening strips are fixedly secured to each end fitting.

13. A hose according to claim 12, wherein the axial strengthening strips do not extend around the entire circumference of the hose.

14. A hose according to claim 13, wherein the tubular body comprises an inner and outer reinforcing layer, and the sealing layer is sandwiched between the inner and outer reinforcing layers.

15. A hose according to claim 14, wherein the or each reinforcing layer of the tubular body, and the axial strengthening strips, are all made of the same polymeric material.

16. A hose according to claim 15, wherein the or each reinforcing layer of the tubular body, and the axial strengthening strips, are all made of UHMWPE.

17. A hose according to claim 16, wherein each individual strip has a width such that it covers from about 5% to about 20% of the total circumference of the underlying part of the hose.

* * * * *

UNITED STATES PATENT AND TRADEMARK OFFICE
CERTIFICATE OF CORRECTION

PATENT NO. : 8,356,636 B2  Page 1 of 1
APPLICATION NO. : 12/312109
DATED : January 22, 2013
INVENTOR(S) : Witz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this
First Day of September, 2015

Michelle K. Lee
*Director of the United States Patent and Trademark Office*